United States Patent
Gauthier et al.

(10) Patent No.: US 9,762,106 B2
(45) Date of Patent: Sep. 12, 2017

(54) MOTOR COOLING SYSTEM

(71) Applicant: Atieva, Inc., Redwood City, CA (US)

(72) Inventors: Jean-Philippe Gauthier, San Francisco, CA (US); Jeremy Mayer, Mountain View, CA (US); Yifan Tang, Los Altos, CA (US)

(73) Assignee: Atieva, Inc., Menlo Park, CA (US)

( * ) Notice: Subject to any disclaimer, the term of this patent is extended or adjusted under 35 U.S.C. 154(b) by 215 days.

(21) Appl. No.: 14/560,680

(22) Filed: Dec. 4, 2014

(65) Prior Publication Data

US 2016/0164377 A1  Jun. 9, 2016

(51) Int. Cl.
| | | |
|---|---|---|
| *H02K 9/00* | (2006.01) | |
| *H02K 9/19* | (2006.01) | |
| *H02K 1/32* | (2006.01) | |
| *H02K 7/116* | (2006.01) | |
| *H02K 5/20* | (2006.01) | |
| *H02K 7/14* | (2006.01) | |

(52) U.S. Cl.
CPC .............. *H02K 9/19* (2013.01); *H02K 1/32* (2013.01); *H02K 5/20* (2013.01); *H02K 7/116* (2013.01); *H02K 7/14* (2013.01)

(58) Field of Classification Search
CPC .. H02K 9/19; H02K 1/32; H02K 7/14; H02K 5/20; H02K 3/24; H02K 9/16; H02K 9/18
USPC ........ 310/54, 71, 260, 61, 179, 60 A, 52, 58, 310/64
See application file for complete search history.

(56) References Cited

U.S. PATENT DOCUMENTS

| | | | |
|---|---|---|---|
| 3,659,125 A | | 4/1972 | Basel |
| 4,600,848 A | * | 7/1986 | Sutrina ............... H02K 9/19 310/211 |
| 5,372,213 A | * | 12/1994 | Hasebe ............... B60K 1/02 180/65.6 |
| 5,682,074 A | * | 10/1997 | Di Pietro .......... B22D 19/0054 310/211 |
| 6,087,744 A | | 7/2000 | Glauning |
| 6,191,511 B1 | * | 2/2001 | Zysset ............... H02K 9/19 310/53 |
| 7,156,195 B2 | | 1/2007 | Yamagishi et al. |
| 7,489,057 B2 | | 2/2009 | Zhou et al. |
| 8,395,288 B2 | * | 3/2013 | Huynh ............... H02K 9/00 310/52 |

(Continued)

FOREIGN PATENT DOCUMENTS

| | | |
|---|---|---|
| DE | 10 2012 022 453 | 5/2014 |
| DE | 102012022453 | 5/2014 |

(Continued)

OTHER PUBLICATIONS

"Car Oil & Lubrication System: Overview" from http://Schoolworkhelper.net/car-oil-lubrication-system-overview/.*

(Continued)

*Primary Examiner* — Hanh Nguyen
(74) *Attorney, Agent, or Firm* — Patent Law Office of David G. Beck

(57) ABSTRACT

A motor assembly with an integrated cooling system is provided in which a coolant (e.g., oil) is injected into a hollow region of the rotor shaft. The coolant is expelled out of the rotor shaft and into the motor enclosure via multiple thru-holes, thereby allowing efficient cooling of both the stator and the rotor assemblies.

22 Claims, 8 Drawing Sheets

(56) References Cited

U.S. PATENT DOCUMENTS

| | | | |
|---|---|---|---|
| 9,306,433 B2* | 4/2016 | Sten | H02K 9/19 |
| 2003/0030333 A1* | 2/2003 | Johnsen | H02K 1/32 |
| | | | 310/54 |
| 2003/0132673 A1* | 7/2003 | Zhou | H02K 1/32 |
| | | | 310/54 |
| 2004/0080218 A1* | 4/2004 | Weidman | H02K 1/32 |
| | | | 310/61 |
| 2004/0134693 A1* | 7/2004 | Yamagishi | F16H 57/0476 |
| | | | 180/65.1 |
| 2008/0024020 A1* | 1/2008 | Iund | H02K 5/20 |
| | | | 310/61 |
| 2008/0272661 A1* | 11/2008 | Zhou | H02K 9/19 |
| | | | 310/61 |
| 2010/0194220 A1* | 8/2010 | Tatematsu | H02K 1/2766 |
| | | | 310/61 |
| 2010/0295391 A1* | 11/2010 | Perkins | B60K 6/48 |
| | | | 310/64 |
| 2012/0104884 A1 | 5/2012 | Wagner et al. | |
| 2012/0220379 A1* | 8/2012 | Murakami | H02K 9/19 |
| | | | 464/7 |
| 2012/0305226 A1* | 12/2012 | Chamberlin | H02K 5/20 |
| | | | 165/121 |
| 2013/0043747 A1* | 2/2013 | Kubes | H02K 9/19 |
| | | | 310/54 |
| 2013/0214624 A1* | 8/2013 | Kubes | H02K 9/193 |
| | | | 310/54 |
| 2013/0270938 A1* | 10/2013 | Matsuda | B60K 1/00 |
| | | | 310/54 |
| 2013/0270939 A1* | 10/2013 | Brandl | H02K 9/19 |
| | | | 310/54 |
| 2013/0313928 A1* | 11/2013 | McKinzie | H02K 1/32 |
| | | | 310/54 |
| 2013/0334912 A1* | 12/2013 | Tokunaga | H02K 9/19 |
| | | | 310/54 |
| 2016/0099633 A1* | 4/2016 | Yoshinori | H02K 9/19 |
| | | | 310/53 |

FOREIGN PATENT DOCUMENTS

| | | | | |
|---|---|---|---|---|
| GB | 2357377 A | * | 6/2001 | H02K 7/00 |
| JP | H8-205475 | | 8/1996 | |
| JP | 2013-009508 | | 1/2013 | |
| JP | 2013-115848 | | 6/2013 | |
| JP | 2013-198311 | | 9/2013 | |

OTHER PUBLICATIONS

"Derwent report 2004-341850" for patent publication US 2004/0134693 A1.*

* cited by examiner

MOTOR COOLING SYSTEM

FIELD OF THE INVENTION

The present invention relates generally to the electric motor assembly of an electric vehicle and, more particularly, to an efficient motor cooling system that can be used to cool the critical elements of the motor assembly.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drive train of a hybrid vehicle is typically much more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

In order to achieve the desired levels of performance and reliability in an electric vehicle, it is critical that the temperature of the traction motor remains within its specified operating range regardless of ambient conditions or how hard the vehicle is being driven. A variety of approaches have been used to try and adequately cool the motor in an electric car. For example, U.S. Pat. No. 6,191,511 discloses a motor that incorporates a closed cooling loop in which the coolant is pumped through the rotor. A stationary axial tube mounted within the hollow rotor injects the coolant while a series of blades within the rotor assembly pump the coolant back out of the rotor and around the stator. Heat withdrawal is accomplished using fins integrated into the motor casing that allow cooling via ambient air flow.

U.S. Pat. No. 7,156,195 discloses a cooling system for use with the electric motor of a vehicle. The refrigerant used in the cooling system passes through an in-shaft passage provided in the output shaft of the motor as well as the reduction gear shaft. A refrigerant reservoir is formed in the lower portion of the gear case while an externally mounted cooler is used to cool the refrigerant down to the desired temperature.

U.S. Pat. No. 7,489,057 discloses a rotor assembly cooling system utilizing a hollow rotor shaft. The coolant feed tube that injects the coolant into the rotor shaft is rigidly coupled to the rotor shaft using one or more support members. As a result, the rotor and the injection tube rotate at the same rate. The coolant that is pumped through the injection tube flows against the inside surface of the rotor shaft, thereby extracting heat from the assembly.

While there are a variety of techniques that may be used to cool an electric vehicle's motor, these techniques typically only provide limited heat withdrawal. Accordingly, what is needed is an effective cooling system that may be used with the high power density, compact electric motors used in high performance electric vehicles. The present invention provides such a cooling system.

SUMMARY OF THE INVENTION

The present invention provides a motor assembly with an integrated cooling system comprised of (i) a stator contained within a motor enclosure; (ii) a rotor shaft passing between the first end cap and the second end cap of the motor enclosure; (iii) a rotor mounted to the rotor shaft, where the rotor shaft includes a hollow region; (iv) a coolant pump (i.e., an electric coolant pump or a mechanical coolant pump) for injecting coolant (e.g., oil) into the motor assembly; (v) a coolant reservoir in fluid communication with the coolant pump; (vi) a first coolant passageway, where the first coolant passageway is integral to the first end cap, where the first coolant passageway fluidly couples the coolant pump to the hollow region of the rotor shaft, where the first coolant passageway further comprises an output aperture located within the bore of the first end cap and adjacent to the rotor shaft, where the rotor shaft includes at least one intake thru-hole, and where the coolant flowing through the first coolant passageway and through the output aperture is injected by the coolant pump into the hollow region of the rotor shaft via the at least one intake thru-hole; (vii) a second coolant passageway, where the second coolant passageway fluidly couples a region within the motor enclosure to the coolant reservoir, and where the coolant within the region of the motor enclosure flows into the coolant reservoir via the second coolant passageway; and (viii) a plurality of thru-holes integrated into the rotor shaft, where each of the plurality of thru-holes fluidly couples the hollow region of the rotor shaft to the region within the motor enclosure, where the coolant passing from the hollow region to the region within the motor enclosure directly contacts the stator and the rotor prior to flowing through the second passageway into the coolant reservoir. The plurality of thru-holes may have at least one thru-hole located adjacent to the first end of the rotor and at least one thru-hole located adjacent to the second end of the rotor. The axis of each of the plurality of thru-holes may be perpendicular to the cylindrical axis of the rotor shaft. The axis of each of the plurality of thru-holes may be angled relative to the cylindrical axis of the rotor shaft. The assembly may include a pair of seals that confine the coolant, where the coolant may be pressurized, within a region defined by the rotor shaft, the bore of the first end cap, and the first and second seals.

In one aspect, the first coolant passageway may further include a gearbox coolant coupling, where the gearbox coolant coupling fluidly couples the first coolant passageway to a gearbox, where the coolant flowing through the first coolant passageway is injected by the coolant pump into the gearbox via the gearbox coolant coupling, where a third coolant passageway fluidly couples the gearbox to the coolant reservoir, and where the coolant flowing into the gearbox from the first coolant passageway via the gearbox coolant coupling flows into the coolant reservoir via the third coolant passageway.

In another aspect, the second coolant passageway may further include an output aperture located within the region of the motor enclosure, where the output aperture is located between the stator and an inner wall of the motor enclosure, and where the coolant within the region of the motor enclosure passes through the output aperture and the second passageway before flowing into the coolant reservoir.

In another aspect, the assembly may include a third coolant passageway that fluidly couples the coolant pump to the region within said motor enclosure, where the coolant flowing through the third coolant passageway is directly injected by the coolant pump into the region of the motor enclosure. The assembly may further include a plurality of nozzles that are incorporated into the motor enclosure (e.g., the motor casing), where each of the plurality of nozzles is fluidly coupled to the third coolant passageway, and where coolant passing from the third coolant passageway to the motor enclosure via the plurality of nozzles directly contacts the stator and the rotor prior to flowing through the second passageway into the coolant reservoir. At least a portion of the plurality of nozzles may be located adjacent to the stator end windings.

In another aspect, the assembly may include a third coolant passageway that fluidly couples a second coolant pump to the region within the motor enclosure, where the coolant flowing through the third coolant passageway is directly injected by the second coolant pump into the region of the motor enclosure. The assembly may further include a plurality of nozzles that are incorporated into the motor enclosure (e.g., the motor casing), where each of the plurality of nozzles is fluidly coupled to the third coolant passageway, and where coolant passing from the third coolant passageway to the motor enclosure via the plurality of nozzles directly contacts the stator and the rotor prior to flowing through the second passageway into the coolant reservoir. At least a portion of the plurality of nozzles may be located adjacent to the stator end windings.

In another aspect, the assembly may include a coolant jacket surrounding at least a portion of the motor assembly, where a secondary coolant (e.g., a water-based coolant) flows through the coolant jacket, and where a second cooling pump circulates the secondary coolant throughout the coolant jacket via a cooling conduit. The cooling jacket may be integrated within a motor casing.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

The motor and cooling systems described and illustrated herein are generally designed for use in a vehicle using an electric motor, e.g., an electric vehicle (EV), and may be used with a single speed transmission, a dual-speed transmission, or a multi-speed transmission. In the following text, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
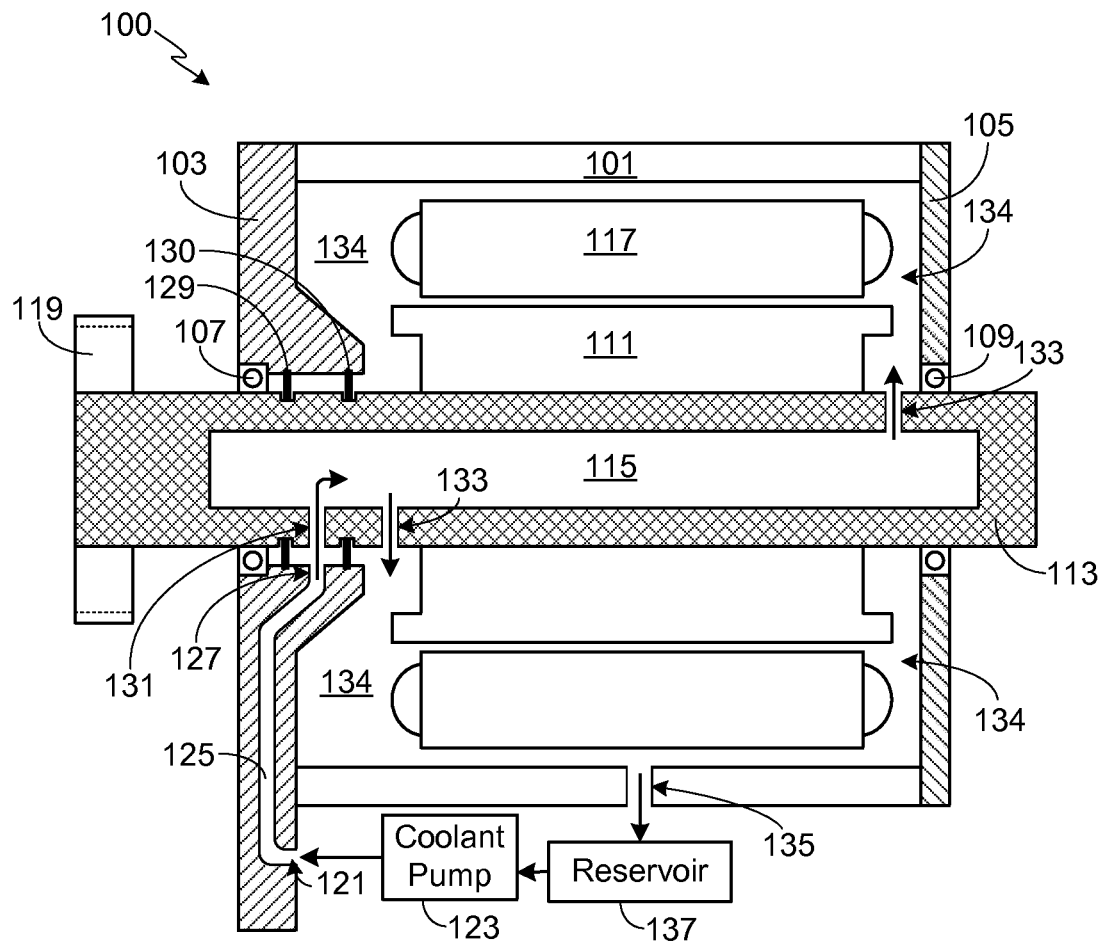
FIG. 1 provides a simplified cross-sectional view of the primary elements of a motor assembly utilizing a pressurized cooling system in accordance with a preferred embodiment of the invention.

FIG. 1 provides a cross-sectional view of the primary elements of a motor and integrated cooling system 100. In at least one embodiment, the motor housing is a multi-piece housing comprised of a cylindrical motor casing 101 that is mechanically coupled to front and rear end caps 103 and 105, respectively. The motor's core assembly, which is supported on either end by bearing assemblies 107 and 109, includes the rotor 111 and the rotor shaft 113. The center portion 115 of rotor shaft 113 is hollow. Also visible in this figure is stator 117.

At one end of rotor shaft 113 is a drive gear 119. Although not shown in this figure, drive gear 119 is contained within a gearbox (i.e., gear housing). The gearbox may be separate from motor 100; alternately, the gearbox or at least one wall of the gearbox may be integral with front motor housing member 103. An exemplary configuration utilizing an integrated motor/gearbox housing is shown in co-assigned U.S. patent application Ser. No. 14/503,683, filed 1 Oct. 2014, the disclosure of which is incorporated herein for any and all purposes.

Integrated into one of the end caps of the motor assembly, and preferably integrated into front motor end cap 103 as shown, is a coolant intake 121. Preferably the coolant is non-gaseous and has thermal and mechanical properties suitable for a liquid motor coolant, e.g., high heat capacity, high break-down temperature and a relatively low viscosity. Additionally, as the coolant flows between the rotor and stator as well as a small portion of the rotor shaft and the end cap, in the preferred embodiment the coolant is also a good lubricant and is electrically non-conductive. Accordingly, in at least one embodiment oil is used as the coolant.

In the preferred embodiment illustrated in FIG. 1, the coolant passing into intake 121 is pressurized via coolant pump 123. In this embodiment coolant pump 123 is an external pump, for example an electric pump, although other types of pumps may be used such as a mechanical pump powered by shaft 113 as described in detail below. Coolant intake 121 is coupled to a coolant passageway 125 that is preferably incorporated within end cap 103 as shown. Passageway 125 connects intake 121 to output aperture 127. Output aperture 127 is within the bore of end cap 103, and thus is immediately adjacent to rotor shaft 113. The coolant is confined within the region between rotor shaft 113 and the bore of end cap 103 by a pair of seals 129/130. Seals 129 and 130 are not limited to a particular type of seal; rather they may be comprised of any of a variety of different seal types (e.g., rotary shaft seals) that form an adequate seal between shaft 113 and end cap 103 while allowing the shaft to freely rotate within the motor housing. In the preferred embodiment seal rings 129/130 fit within grooves formed within the bore of end cap 103 and the outer surface of rotor shaft 113 as shown. Seals 129 and 130 may be fabricated from any of a variety of materials (e.g., fluorosilicone, nitrile, silicone, polyacrylate, FEP, etc.).

Rotor shaft 113 includes one or more intake thru-holes 131 immediately adjacent to the region defined by rotor shaft 113, the bore of end cap 103, and seals 129/130. Intake thru-hole(s) 131 allows coolant passing through coolant passageway 125 to flow into the central, hollow region 115 of rotor shaft 113. The coolant within region 115 is then forced out of shaft 113 through multiple thru-holes 133, this coolant flowing throughout region 134 of the motor enclosure. The coolant within the motor enclosure eventually flows through one or more output apertures 135 before being collected into coolant reservoir 137. Reservoir 137 is coupled to coolant pump 123. Preferably the motor enclosure output apertures 135 are incorporated into cylindrical motor casing 101, and more preferably into a central region of cylindrical motor casing 101 as shown, thus causing the coolant to flow completely around stator 117 before exiting the enclosure. The heat absorbed by the coolant can then be transferred to the ambient environment or to another thermal system (e.g., refrigeration system) using any of a variety of well-known techniques.

The embodiment described above provides efficient heat removal via multiple thermal pathways. Specifically, circulating the coolant throughout the system allows heat to be removed via direct transfer between the coolant and the rotor shaft (e.g., via region 115 within shaft 113), between the coolant and rotor 111, and between the coolant and the stator 117. This approach also effectively cools the motor bearings.

Figure 2:
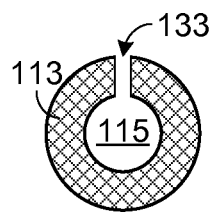
FIG. 2 provides a cross-sectional view of a portion of the rotor shaft shown in FIG. 1.
Figure 3:
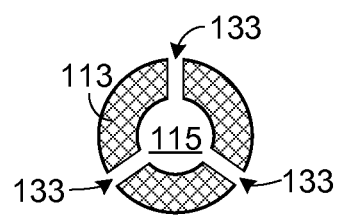
FIG. 3 provides a cross-sectional view of the portion of the rotor shaft shown in FIG. 2, modified to include additional coolant thru-holes.

The coolant distribution thru-holes 133 may be configured in a variety of ways, depending upon flow rate, coolant pressure and the desired flow pattern. For example, in addition to controlling hole size, the number of thru-holes may be varied. For example, FIG. 2 shows a cross-sectional view of rotor shaft 113 with a single distribution hole 133 while FIG. 3 shows a similar cross-sectional view with three distribution thru-holes 133. Similarly, the placement and the angle of the thru-holes may be used to direct coolant flow within the motor enclosure. For example, in the motor and integrated cooling system shown in FIG. 4, the coolant distribution thru-holes 401 are angled to optimize coolant flow around rotor end-rings 403 and towards the stator end windings 405.

Figure 4:
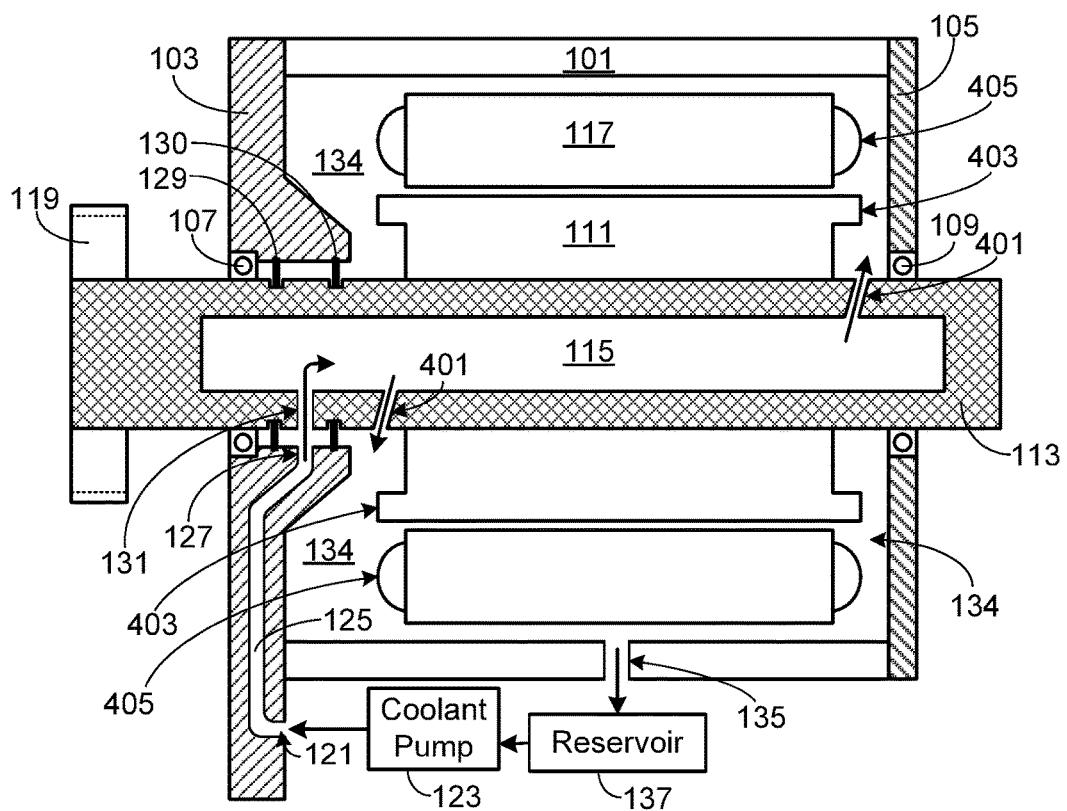
FIG. 4 provides a cross-sectional view of the motor assembly shown in FIG. 1, modified to optimize the trajectory of the coolant flowing out of the rotor shaft and into the motor enclosure.
Figure 5:
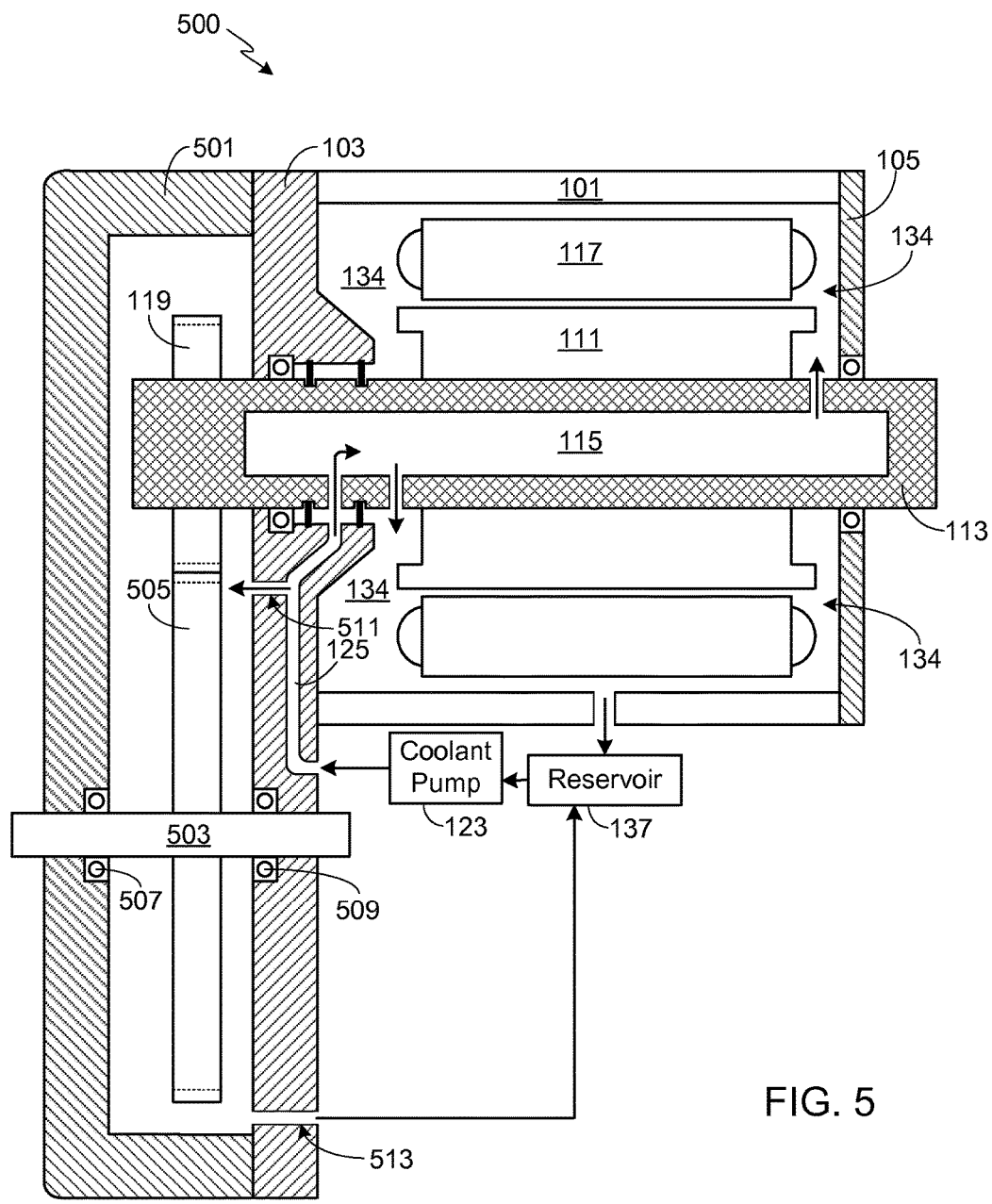
FIG. 5 provides a cross-sectional view of the motor assembly shown in FIG. 1, modified to include gearbox cooling.

In addition to effectively cooling the critical elements of the motor, the cooling system illustrated in FIGS. 1 and 4 can also be used to simultaneously cool the gearbox. FIG. 5 illustrates a variation of the previously illustrated motor modified to provide gearbox cooling. In system 500 the gearbox housing includes a front gearbox casing 501 that is coupled to front motor cap 103. It will be appreciated that the configuration of the gearbox does not impact the application of the cooling system. For example, the cooling system could also be used if the entire gearbox housing was integral to the front motor cap as described in co-assigned U.S. patent application Ser. No. 14/503,683. The output drive shaft 503 is coupled to rotor shaft 115 via a plurality of gears (e.g., gears 119 and 505). Drive shaft 503 is supported on either end by bearing assemblies 507 and 509.

In system 500, the pressurized coolant (e.g., oil) is coupled via passageway 125 to the rotor shaft and motor assembly as previously described, and is also coupled to the gearbox via gearbox coolant coupling 511. If the gearbox housing includes a separate casing member rather than using end cap 103 as shown, the coolant coupling passes through the separate casing member as well as the end cap in order to effectively couple coolant passageway 125 to the gearbox. The coolant within the gearbox enclosure eventually flows through coolant passageway 513 before being collected in coolant reservoir 137 and recirculated.

Figure 6:
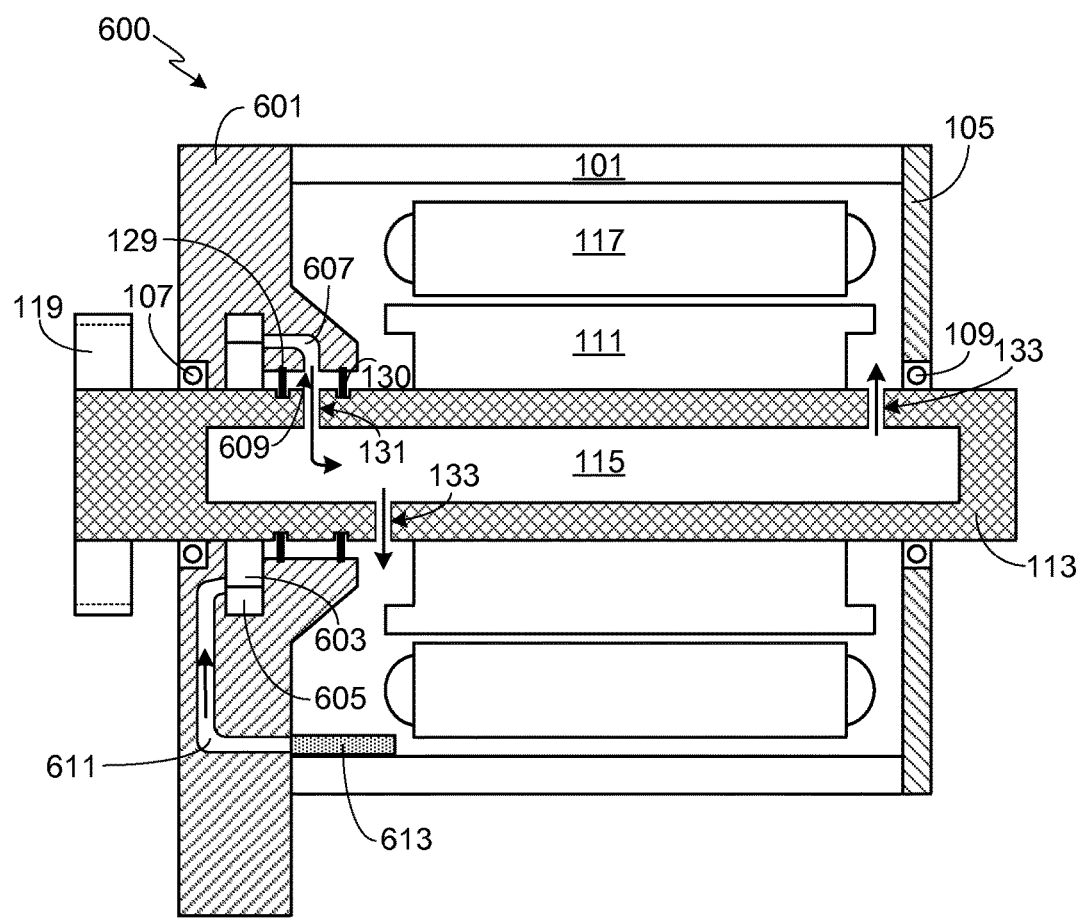
FIG. 6 provides a cross-sectional view of the motor assembly shown in FIG. 1, modified to incorporate an integrated coolant pump.

As previously noted, the embodiments shown in FIGS. 1-5 may utilize either an external coolant pump, e.g., an electric coolant pump, or an integrated mechanical pump. FIG. 6 illustrates a variation of the embodiment shown in FIG. 1, modified to incorporate a mechanical coolant pump where the mechanical pump is powered by rotation of the rotor shaft. It should be understood that this modification is equally applicable to the configurations shown in FIGS. 4 and 5.

In system 600, the motor end cap 601 has been modified from that of the previous embodiments in order to accommodate a mechanical coolant pump. The inner pump rotor 603 is coupled to rotor shaft 113 while the outer pump rotor 605 is fixed within end cap 601. As in the prior embodiment, the coolant, e.g., oil, is pressurized and pumped through a passageway, e.g., passageway 607, to an output aperture 609. Output aperture 609 is located within the bore of end cap 601 and immediately adjacent to the outer surface of rotor shaft 113. The coolant is confined within the region between rotor shaft 113 and the bore of end cap 601 by the pressurized dynamic seals 129/130.

As in the prior embodiments, after the coolant passes through aperture 609 and into the region defined by the rotor 113, end cap 60 and seals 129/130, the coolant is forced through intake thru-hole 131 into the hollow region 115 of rotor shaft 113. The coolant within region 115 is then forced out of shaft 113 through multiple thru-holes 133, this coolant flowing throughout the motor enclosure. A second coolant passageway 611, preferably integrated into end cap 601 as shown, provides a return flow path for the coolant to the integrated coolant pump. In the illustrated embodiment a filter 613 is incorporated into the coolant return. It should be understood that the mechanical coolant pump illustrated in FIG. 6 may also be used in a configuration such as that shown in either FIG. 4 or 5.

In the embodiments illustrated in FIGS. 1-6 the coolant, e.g., oil, is pressurized in order to insure high coolant flow rates throughout the motor enclosure. If high flow rates are not required, for example if the motor is a low performance motor and is not expected to generate excessive heat levels, then a non-pressurized coolant injection technique may be used to inject the coolant into the hollow rotor shaft.

Figure 7:
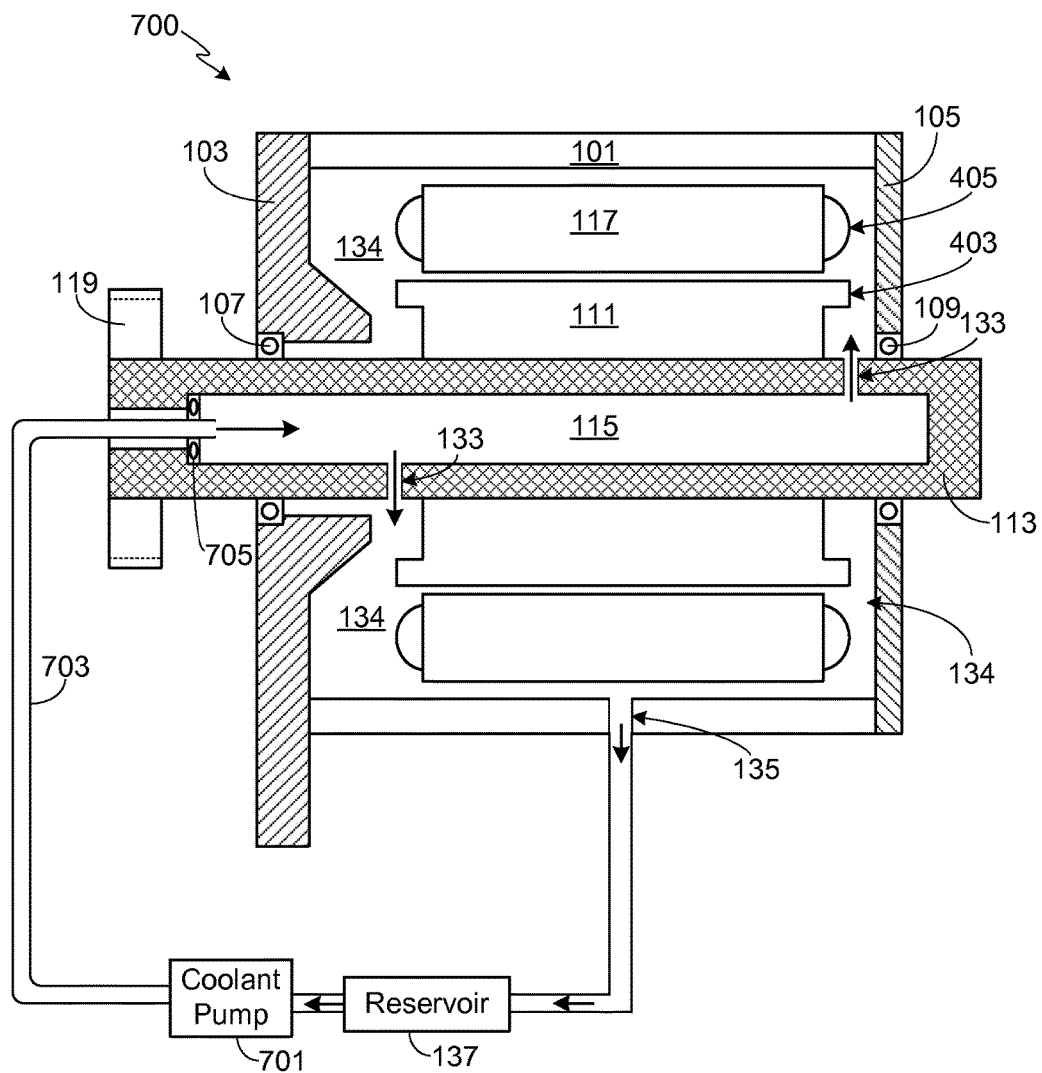
FIG. 7 provides a cross-sectional view of the motor assembly shown in FIG. 1, modified to incorporate a non-pressurized coolant injection system.

FIG. 7 illustrates a variation of the embodiment shown in FIG. 1, modified to incorporate a non-pressurized coolant injection system. It should be understood that this modification is equally applicable to other coolant distribution thru-hole configurations, depending upon desired flow rate and flow pattern. Thus the diameter, number and angle of the thru-holes may be varied as discussed above and illustrated in FIGS. 2-4.

In system 700, coolant pump 701 (either an electrical or a mechanical coolant pump) pumps the coolant, preferably an oil as noted above, through injection tube 703 into one end of rotor shaft 113. Preferably injection tube 703 is stationary as shown. It will be appreciated that the injection tube can be installed in either end of the rotor shaft. Injection tube 703 is sealed within rotor shaft 113 via a seal 705, where seal 705 may be of any of a variety of different seal types (e.g., rotary shaft seals) that form an adequate seal between injection tube 703 and shaft 113 while allowing the shaft to freely rotate within the motor housing. Once the coolant is injected into rotor shaft 113, centrifugal force causes the coolant to pass through rotor shaft thru-holes 133 and into the motor enclosure. The coolant within the motor enclosure eventually flows through one or more output apertures 135 before being collected into coolant reservoir 137. Reservoir 137 is coupled to coolant pump 701.

Figure 8:
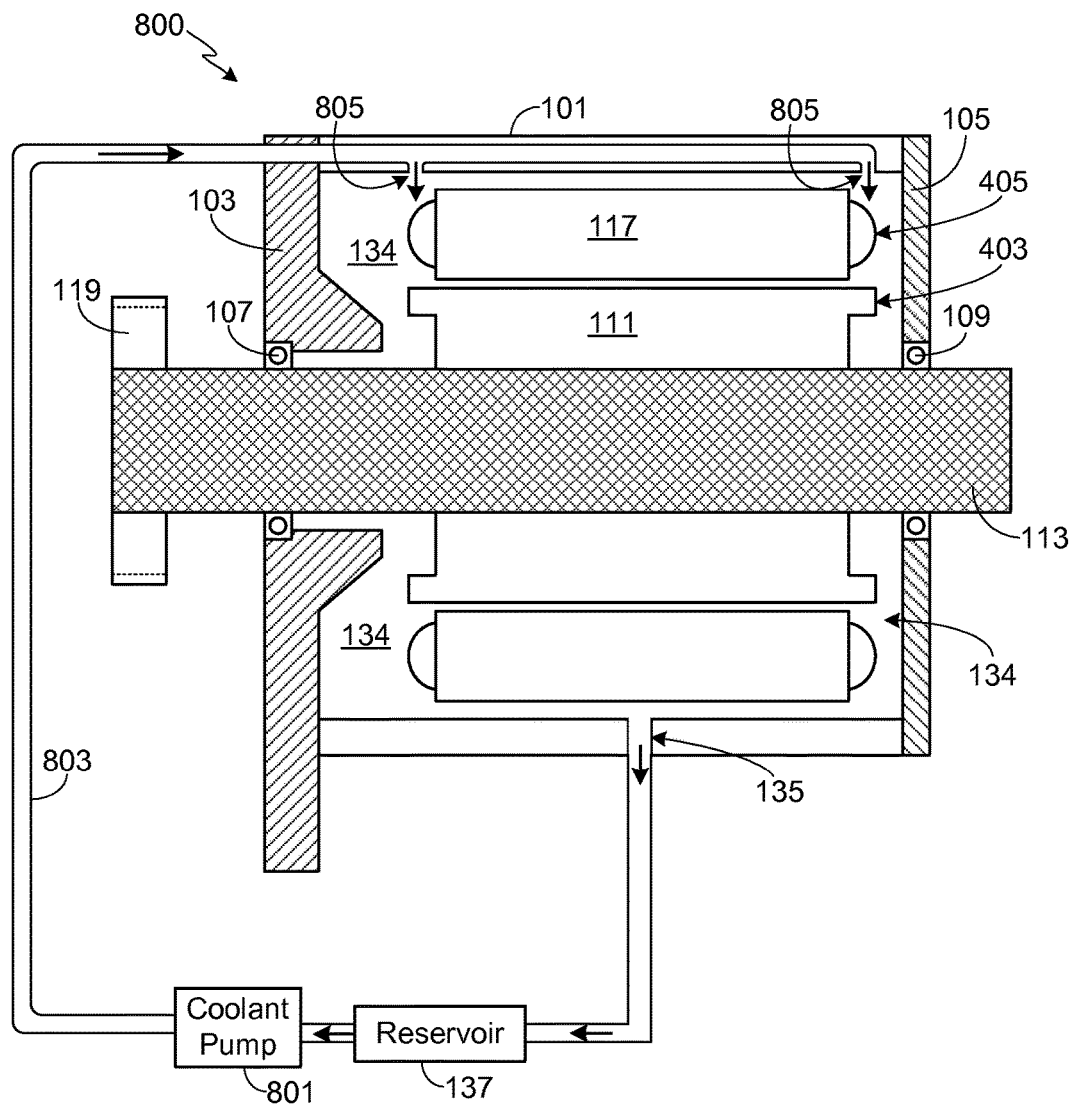
FIG. 8 provides a cross-sectional view of the motor assembly shown in FIG. 1, modified to use a non-pressurized coolant injection system to inject coolant directly into the motor housing.

A non-pressurized coolant injection system may also be used to inject coolant directly into the motor enclosure as illustrated in FIG. 8. As shown, coolant pump 801 pumps coolant, preferably oil as previously disclosed, through coolant injection tube 803. Coolant injection tube 803 passes through the motor enclosure where it is terminated by one or more injection nozzles 805 located at either end of stator 117 and at or near the top of motor casing 101. As a result of this nozzle placement, gravity causes the coolant flowing out of nozzles 805 to pass over stator 117 and stator end windings 405 before eventually passing through one or more casing output apertures 135 located at or near the bottom of the casing and being collected in reservoir 137. It will be appreciated that at least some of the coolant flowing through nozzles 805 will be distributed throughout the motor enclosure by the spinning rotor 111 and rotor end-rings 403.

Figure 9:
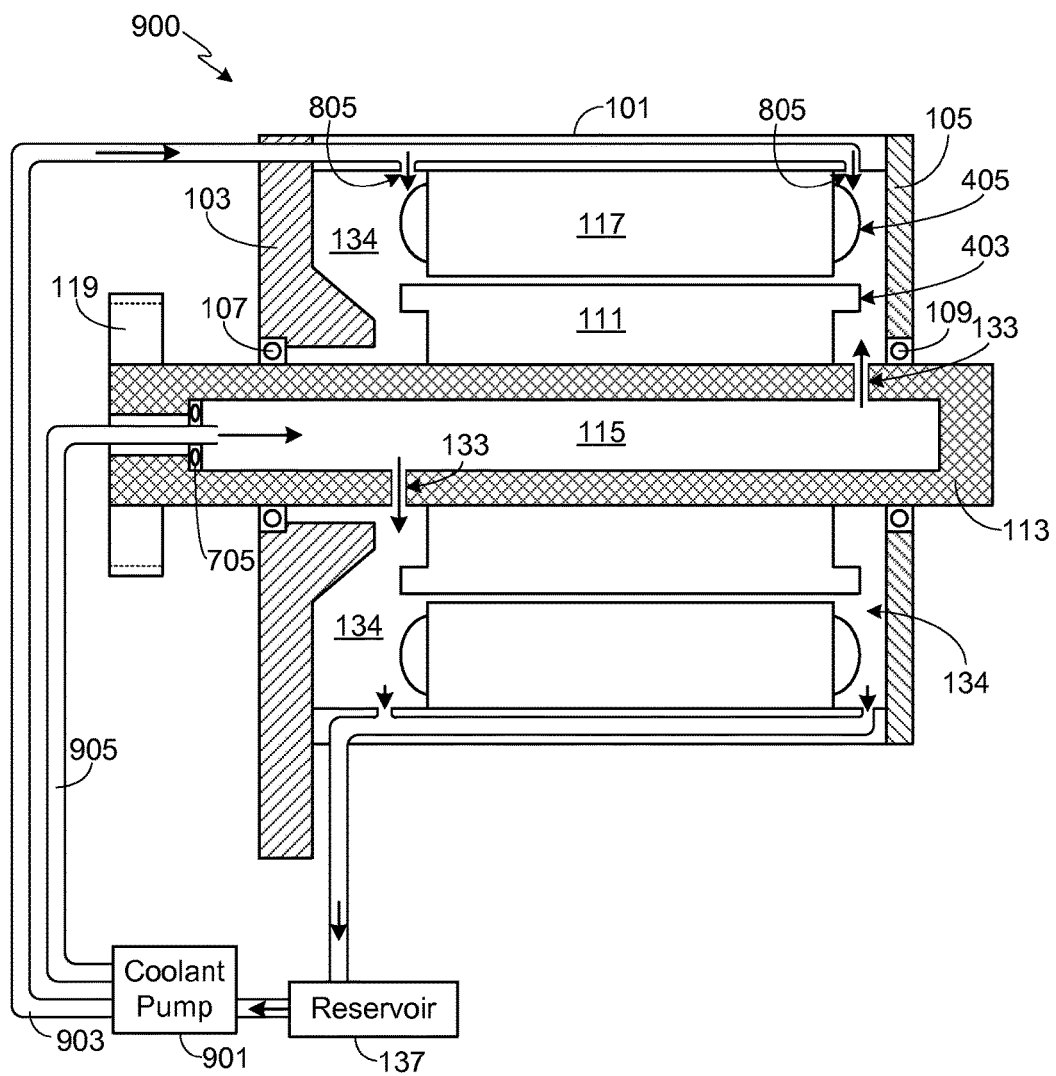
FIG. 9 provides a cross-sectional view of a motor assembly utilizing a non-pressurized coolant injection system to inject coolant into the rotor shaft as shown in FIG. 7 and directly into the motor housing as shown in FIG. 8.

Motor assembly 900, shown in FIG. 9, combines the non-pressurized coolant injection systems of motors 700 and 800 shown in FIGS. 7 and 8, respectively. As such, the coolant (e.g., oil) from reservoir 137 is pumped by coolant pump 901 (either an electrical or a mechanical coolant pump) directly onto stator 117 and stator end windings 405 via injection tube 903, and into rotor shaft 113 via injection tube 905. In addition to cooling the inside of the rotor assembly, the coolant within hollow region 115 of rotor shaft 113 distributes coolant throughout the motor enclosure via thru-holes 133, thereby insuring efficient cooling of the motor assembly. In at least one variation of this embodiment, two coolant pumps are used; one coolant pump injecting coolant directly onto stator 117 and stator end windings 405 via injection tube 903 and a second coolant pump injecting coolant into rotor shaft 113 via injection tube 905. Although the stator in assembly 900 may be mounted as shown in assembly 800, an alternate configuration is illustrated in which stator 117 is mounted directly to the inner surface of motor casing 101. As such, a return coolant passageway 905 is incorporated into casing 101, thereby providing a pathway for the coolant within the motor enclosure to flow into reservoir 137. Note that this same configuration may be used with the prior embodiments.

Figure 10:
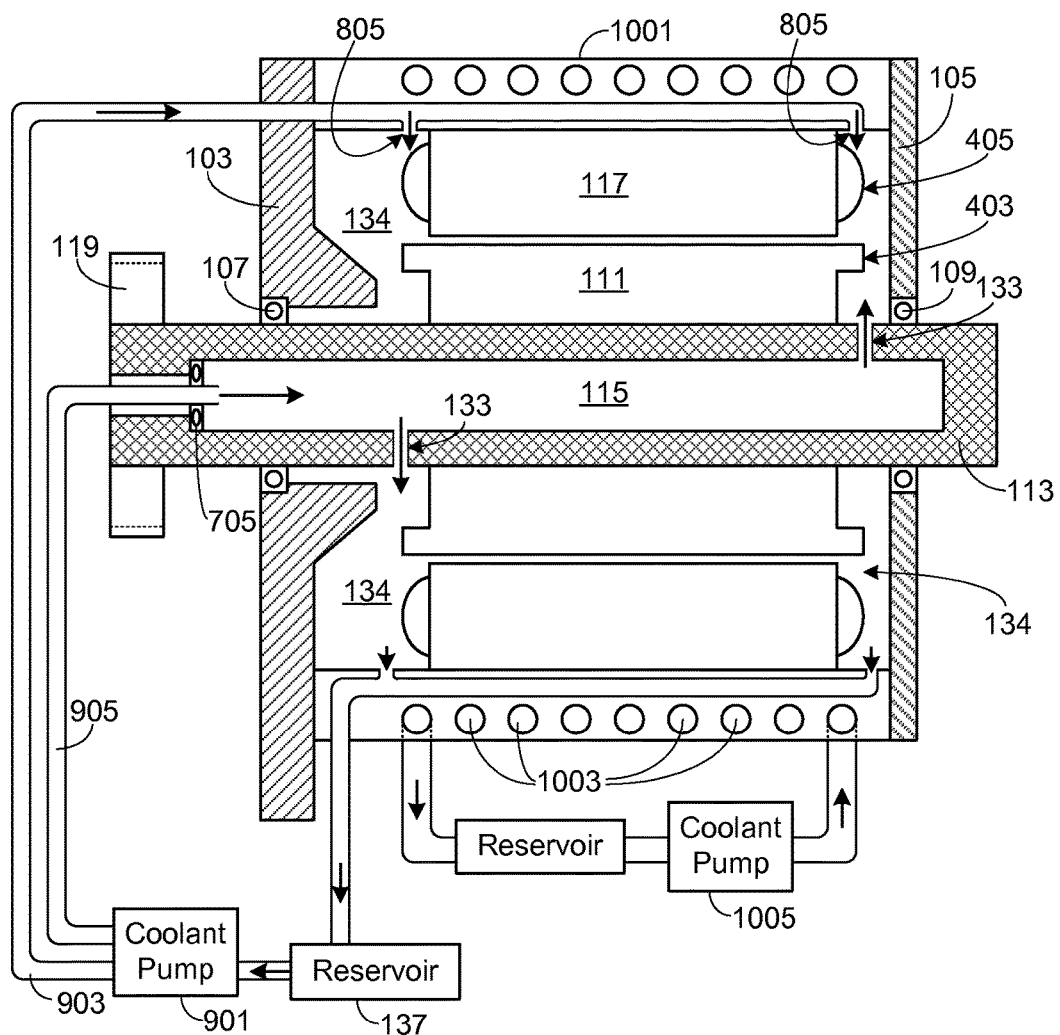
FIG. 10 provides a cross-sectional view of the motor assembly shown in FIG. 9, modified to incorporate a water-based cooling system in the motor casing.

In the motor assembly shown in FIG. 10, in addition to using multiple coolant injection systems to force coolant (e.g., oil) throughout the motor assembly as in motor assembly 900, a secondary coolant system is used to cool the exterior of the motor assembly. The secondary coolant system includes a coolant jacket through which a second coolant passes. Preferably the second coolant is water-based, e.g., pure water or water that includes an additive such as ethylene glycol or propylene glycol. Preferably the coolant jacket is incorporated into motor casing 1001 as shown, thereby avoiding the additional thermal interface that would result from using a coolant jacket that is separate from the motor casing. In the cross-sectional view provided by FIG. 10, a plurality of cooling tubes 1003 is shown in cross-section, where the cooling tubes are integral to the motor casing. The coolant pumped through cooling tubes 1003 by secondary coolant pump 1005 conductively cools the stator 117 while the primary coolant, pumped by coolant pump 901, provides direct cooling to stator 117, stator end windings 405, rotor 111 and rotor shaft 113. It should be understood that a coolant jacket such as that shown in FIG. 10 may be added to any of the previously described embodiments to provide a secondary cooling system, a feature that is especially beneficial in a high performance motor that generates a significant amount of heat during operation.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A motor assembly with an integrated cooling system, comprising:
   a stator contained within a motor enclosure;
   a rotor shaft, wherein said rotor shaft passes between a first end cap and a second end cap of said motor enclosure, wherein a first end portion of said rotor shaft extends beyond said first end cap of said motor enclosure, wherein a second end portion of said rotor shaft extends beyond said second end cap of said motor enclosure, and wherein said rotor shaft is comprised of a first end surface corresponding to said first end portion, a second end surface corresponding to said second end portion, and a cylindrical portion connecting said first end surface to said second end surface;

a rotor mounted to said rotor shaft, wherein said rotor shaft includes a hollow region;

a coolant pump for injecting a coolant into said motor assembly;

a coolant reservoir in fluid communication with said coolant pump;

a first coolant passageway, wherein said first coolant passageway is integral to said first end cap, wherein said first coolant passageway fluidly couples said coolant pump to said hollow region of said rotor shaft, wherein a radial portion of said first coolant passageway extends in a radial direction through said first end cap, wherein said radial portion of said first coolant passageway terminates in an output aperture located within a bore of said first end cap, wherein said coolant passing through said radial portion of said first coolant passageway and through said output aperture is directed in a radial direction into said bore of said first end cap, wherein said output aperture is adjacent to a cylindrical surface corresponding to said cylindrical portion of said rotor shaft, wherein said cylindrical surface corresponding to said cylindrical portion of said rotor shaft includes at least one radially directed intake thru-hole, wherein said at least one radially directed intake thru-hole directs said coolant in said radial direction between said cylindrical surface and said hollow region, wherein said coolant flowing through said first coolant passageway and through said output aperture is injected by said coolant pump into said hollow region of said rotor shaft via said at least one radially directed intake thru-hole;

a second coolant passageway, wherein said second coolant passageway fluidly couples a region within said motor enclosure to said coolant reservoir, and wherein said coolant within said region of said motor enclosure flows into said coolant reservoir via said second coolant passageway; and a plurality of thru-holes integrated into said rotor shaft, wherein each of said plurality of thru-holes fluidly couples said hollow region of said rotor shaft to said region within said motor enclosure, wherein said coolant passing from said hollow region to said region within said motor enclosure directly contacts said stator and said rotor prior to flowing through said second passageway into said coolant reservoir.

2. The motor assembly of claim 1, further comprising a first seal and a second seal, wherein said first seal and said second seal confines said coolant passing through said first coolant passageway and through said output aperture within a region defined by said rotor shaft, said bore of said first end cap, said first seal and said second seal.

3. The motor assembly of claim 2, wherein said coolant injected into said motor assembly is pressurized.

4. The motor assembly of claim 1, said first coolant passageway further comprising a gearbox coolant coupling, wherein said gearbox coolant coupling fluidly couples said first coolant passageway to a gearbox, wherein said coolant flowing through said first coolant passageway is injected by said coolant pump into said gearbox via said gearbox coolant coupling, wherein a third coolant passageway fluidly couples said gearbox to said coolant reservoir, and wherein said coolant flowing into said gearbox from said first coolant passageway via said gearbox coolant coupling flows into said coolant reservoir via said third coolant passageway.

5. The motor assembly of claim 1, said second passageway further comprising an intake aperture located within said region of said motor enclosure, wherein said intake aperture is located between said stator and an inner wall of said motor enclosure, and wherein said coolant within said region of said motor enclosure passes through said intake aperture and said second passageway before flowing into said coolant reservoir.

6. The motor assembly of claim 1, said plurality of thru-holes comprising at least one thru-hole located adjacent to a first end of said rotor and at least one thru-hole located adjacent to a second end of said rotor.

7. The motor assembly of claim 1, wherein an axis corresponding to each of said plurality of thru-holes is perpendicular to a cylindrical axis corresponding to said rotor shaft.

8. The motor assembly of claim 1, wherein an axis corresponding to each of said plurality of thru-holes is angled relative to a cylindrical axis corresponding to said rotor shaft.

9. The motor assembly of claim 1, further comprising a third coolant passageway, wherein said third coolant passageway fluidly couples said coolant pump to said region within said motor enclosure, wherein said coolant flowing through said third coolant passageway is injected by said coolant pump directly into said region of said motor enclosure.

10. The motor assembly of claim 9, further comprising a plurality of nozzles incorporated into said motor enclosure, wherein each of said plurality of nozzles is fluidly coupled to said third coolant passageway, and wherein said coolant passing through said third coolant passageway into said motor enclosure via said plurality of nozzles directly contacts said stator and said rotor prior to flowing through said second passageway into said coolant reservoir.

11. The motor assembly of claim 10, wherein said plurality of nozzles are incorporated into a motor casing of said motor enclosure.

12. The motor assembly of claim 10, wherein at least a portion of said plurality of nozzles are located adjacent to a plurality of stator end windings corresponding to said stator.

13. The motor assembly of claim 1, further comprising a third coolant passageway, wherein said third coolant passageway fluidly couples a second coolant pump to said region within said motor enclosure, wherein said coolant flowing through said third coolant passageway is injected by said second coolant pump directly into said region of said motor enclosure.

14. The motor assembly of claim 13, further comprising a plurality of nozzles incorporated into said motor enclosure, wherein each of said plurality of nozzles is fluidly coupled to said third coolant passageway, and wherein said coolant passing through said third coolant passageway into said motor enclosure via said plurality of nozzles directly contacts said stator and said rotor prior to flowing through said second passageway into said coolant reservoir.

15. The motor assembly of claim 14, wherein said plurality of nozzles are incorporated into a motor casing of said motor enclosure.

16. The motor assembly of claim 14, wherein at least a portion of said plurality of nozzles are located adjacent to a plurality of stator end windings corresponding to said stator.

17. The motor assembly of claim 1, wherein said coolant is comprised of an oil.

18. The motor assembly of claim 1, further comprising a coolant jacket surrounding at least a portion of said motor assembly, wherein a secondary coolant flows through said coolant jacket, and wherein a second cooling pump circulates said secondary coolant throughout said coolant jacket via a cooling conduit.

19. The motor assembly of claim 18, wherein said secondary coolant is comprised of a water-based coolant.

20. The motor assembly of claim 18, wherein said coolant jacket is integrated within a motor casing, wherein said motor casing corresponds to a portion of said motor enclosure.

21. The motor assembly of claim 1, wherein said coolant pump is comprised of an electric coolant pump.

22. The motor assembly of claim 1, wherein said coolant pump is comprised of a mechanical coolant pump, and wherein said mechanical coolant pump is powered by rotation of said rotor shaft.

* * * * *